Oct. 16, 1951 C. A. REIMSCHISSEL ET AL 2,571,944
ADJUSTABLE GIB CHASER HOLDER
Filed July 22, 1947
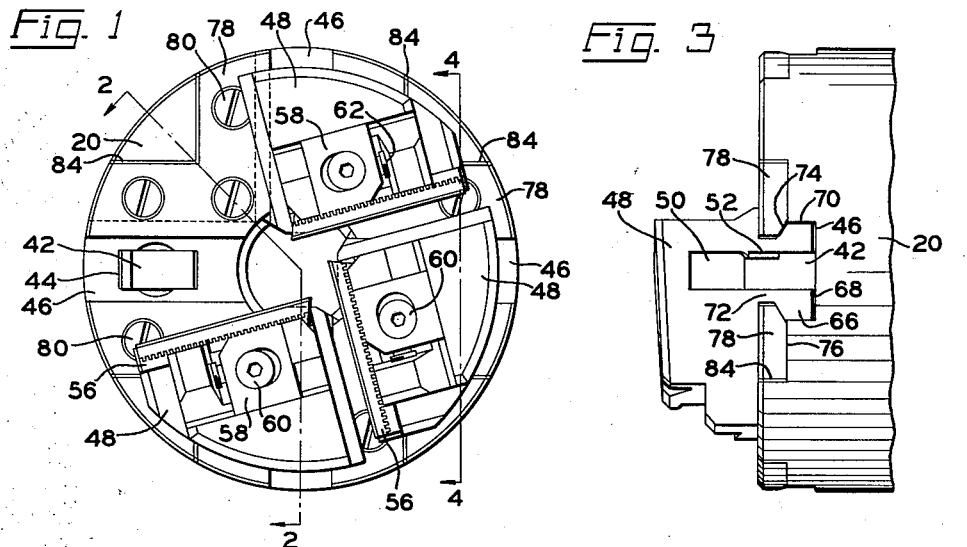
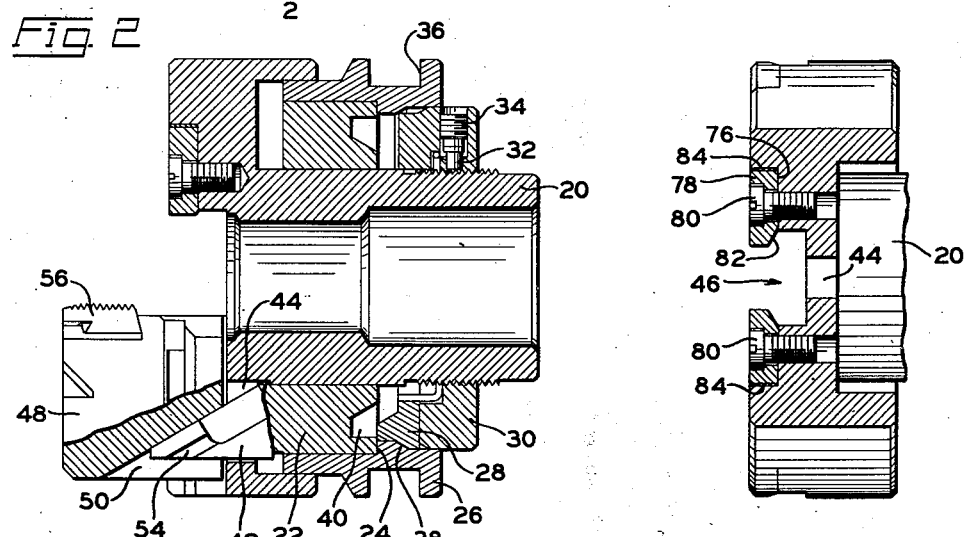
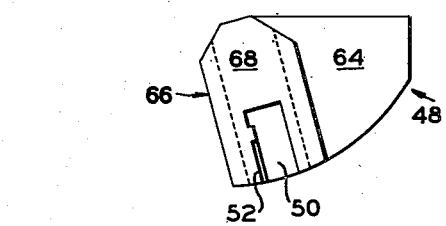
Inventor
CHARLES A. REIMSCHISSEL
HARRY E. DAVIES
By Stone, Boyden & Mack
Attorneys Patented Oct. 16, 1951

2,571,944

UNITED STATES PATENT OFFICE 2,571,944

ADJUSTABLE GIB CHASER HOLDER

Charles A. Reimschissel and Harry E. Davies, Waynesboro, Pa., assignors to The Landis Machine Company, Waynesboro, Pa., a corporation of Pennsylvania Application July 22, 1947, Serial No. 762,586

4 Claims. (Cl. 10—95)

This invention relates to thread cutting mechanisms and more particularly to self-opening die heads of the type employing radially sliding cutter holders. It is specifically concerned with improvements in the structure of such cutter holders and the supporting die head member.

In such constructions, the cutter holders are supported in slideways on the face of the head body member and are moved radially toward or from the work for adjustment of the cutting tools to the proper cutting diameter and for positively withdrawing or disengaging the cutting tools or chasers from the work upon completion of the thread cutting operation. It is essential in such structures that such diametral adjustments be made with extreme accuracy and that the adjusted position of the cutter holders be maintained rigidly until the threading operation is completed. Also, the cutter holders must be held in absolutely rigid fashion to prevent relative movement between said holders and the die head member in a direction parallel to the axis of the die head in order to insure that the thread cutting tools follow each other accurately in the same track or helical groove and thus generate an accurate thread.

This need for rapid movement and accurate and rigid positioning, when taking into account the speed at which such devices customarily operate and the stresses imposed thereon, renders the design of a completely efficient structure of this nature most difficult. A prior effort to solve the problem is disclosed in the Reimschissel Patent No. 2,291,919. Here, it will be noted, the cutter holder clamping and adjusting means are unilateral in their action, that is, any compensation made for wear along the sides of the slideways is necessarily made in one lateral direction only, thus causing the cutter holder to bind against the camming member extending thereinto, centrally of the slideway. Since it is clamped on only one side, the device of the Reimschissel patent is also, after a certain amount of wear, subject to a tilting movement which has an adverse effect on the accuracy of the thread being generated.

It is an object of the invention to provide a cutter holder and mounting structure therefor of more durable and efficient construction and which may be properly adjusted to nullify wear between said cutter holder and mounting means.

Another object is to provide a cutter holder and mounting means therefor in which such adjustment may be made on both sides of the die head engaging portion of the cutter holder.

It is a further object of the invention to provide a cutter holder mounting structure in which the clamping force is applied to the cutter holder equally from opposite directions.

It is another object of the invention to provide clamping means of the above description which is adjustable in one direction to compensate for wear in two directions, namely, laterally of the cutter holder and axially of the die head.

Further objects and advantages will be apparent from the following description of the invention and the accompanying drawings which illustrate a preferred embodiment thereof.

In the drawings:

Figure 1 is a face or end view of a die head normally employing four chaser holders, one of which has been removed to reveal details of the slideways in the face of the head;

Figure 2 is a longitudinal sectional view of the die head taken substantially on the line 2—2 of Figure 1;

Figure 3 is a fragmentary side elevation of the die head and one chaser holder;

Figure 4 is a fragmentary sectional view taken along the line 4—4 of Figure 1; and Figure 5 is an inverted plan view of one of the chaser holders shown in Figures 1 and 3.

Referring to the drawings, the die head comprises a head body 20 in the form of a hollow shank and having an enlarged portion at the forward end for carrying the chaser holders. A closing ring 22 is mounted upon head body 20, surrounding the shank thereof and spaced rearwardly from the enlarged portion thereof. The rearwardly facing surface of closing ring 22 is engaged by the annular shoulder 24, formed on the interior of the operating ring 26.

When the die head is in its closed or thread cutting position as shown in Figure 2, closing ring 22 is also abutted by the forward surfaces of a pair of latch blocks 28 which are mounted in radial slideways in the forward surface of a combined locking and adjusting ring 30 which is threadedly engaged upon the rearward portion of the head body 20.

A locking plug 32 is retained in a tapped, radially extending opening in adjusting ring 30 by a locking screw 34. Screw 34 is employed to force the locking plug 32 against the threads on the exterior of head body 20, thus locking the ring 30 against rotation.

When screw 34 is loosened, ring 30 may be rotated to alter its axial position in relation to head body 20. Thus, if ring 30 is moved forwardly, latch blocks 28 force closing ring 22 forwardly also. If ring 30 is moved rearwardly, closing ring 22 also moves rearwardly under the pressure of compression springs (not shown) mounted between closing ring 22 and the enlarged portion of head body 20. When it is desired to open the die head, the operating ring 26 is moved rearwardly, as by a yoke (not shown) engaging the rectangular groove 36 formed on the exterior of operating ring 26. The camming surface 38 on the interior of operating ring 26 forces latch blocks 28 radially inward so that the said latch blocks enter a groove 40 formed in the rearward surface of closing ring 22 as the latter member is forced rearwardly by the above mentioned springs. Each of the above described axial movements of closing ring 22 is transmitted as radial movement to the chaser holders by means presently to be described.

The foregoing mechanism is described in full detail in the U. S. patent to Reimschissel No. 2,291,919 to which reference may be had for a more complete discussion of its construction and operation.

Closing ring 22 is provided with a plurality of forwardly projecting prongs 42 each of which extends through a suitable opening 44 in the face of head body 20 and into a slideway 46. Slideways 46 and prongs 42 are shown on the drawing as being four in number. It should be understood, however, that any practical number of both may be employed. Each of a plurality of chaser holders 48, mounted for radial sliding movement in slideways 46 is provided with a slot 50 into which prong 42 extends. A camming means 52 is formed integrally with chaser holder 48 along the side of slot 50 (see Figures 3 and 5). This camming means 52 cooperates with a coacting groove 54 formed in each of the prongs 42 to displace chaser holder 48 radially inwardly or outwardly upon axial movement of prong 42 and closing ring 22. Thus, when closing ring 22 is moved axially forward, the coaction between the camming means 52 and grooves 54 causes the chaser holders 48 to slide inwardly toward the axis of the die head, and vice versa.

Each chaser holder 48 is provided, as shown in Figure 1, with a chaser 56 for generating threads upon a cylindrical work piece, a chaser clamp 58 and clamp screw 60 for clamping the chaser 56 in adjusted position, and an adjusting screw 62 for moving the interlocked clamp 58 and chaser 56 into correct tangential thread-cutting position and for absorbing the tangential cutting stresses. This construction is substantially the same as that shown and described in Reimschissel and Eigenbrode Patent No. 2,239,735 and therefore need not be further described.

Chaser holder 48 is formed with a plane base surface 64 from which extends a head engaging portion 66. Portion 66 is formed with a bottom surface 68 parallel to base surface 64 and with side surfaces 70 perpendicular to said surface 68. Portion 66 is joined to chaser holder 48 by the narrowed neck portion 72. Surfaces 74, which join neck portion 72 with surfaces 70 are inclined at a substantial angle with respect to bottom surface 68 for engagement by the holder clamping gibs as will be seen later.

The slideway 46 formed in the face of die head body 20 is rectangular in cross section (see Figure 4) for engagement with side surfaces 70 of chaser holder portion 66. A further rectangular ledge 76 is formed on each side of slideway 46 to receive the holder clamping gibs 78 which are secured to head body 20 by the screws 80. As shown in Figure 1, the gibs 78 are only four in number, each being formed to seat upon two adjacent ledges 76 and to engage simultaneously opposite sides of two chaser holders 48. The surfaces of each gib 78 facing toward slideway 46 are beveled as at 82 to engage the inclined surfaces 74 on chaser holder 48. Thus, when screws 80 are tightened, gibs 78 firmly engage surfaces 74 and hold chaser holder 48 rigidly in position in a direction parallel to the die head axis, yet free to slide radially of the head.

It should be noted from the drawing (Figure 3) that chaser holder surfaces 64 are thus held firmly against the forward surfaces of gibs 78 and the portions of the face of head body 20 which remain unremoved by the formation of slideways 46 and ledges 76. Preferably, and in practice, the chaser holder surfaces are held firmly against the forward surfaces of gibs 78 only, since the face of head body 20 is machined away a fractional amount, so that it is not coplanar with the forward surfaces of the gibs. The bottom surfaces 68 are maintained in clearance relation with the bottom surfaces of slideways 46.

The repeated radial movement of chaser holders 48 in the operation of the diehead causes wear on chaser holder surfaces 64, 70 and 74 and the mating surfaces of head body 20 and gibs 78. Preferably, and in practice, there is no wear on the surface of head body 20 since this surface is machined as referred to above. To eliminate the effects of such wear and to maintain the original precision of fit between these closely related parts, shims 84 are interposed between the vertical sides of ledges 76 and the mating surfaces of gibs 78. To permit this adjustment, clamping screws 80 are made to clear their corresponding holes in gibs 78 so that said gibs may be moved in either direction when said screws are loosened.

Thus any of the gibs 78 may be adjusted by minute amounts toward the center of either of the two slideways to which each gib 78 is adjacent. In the case of wear along chaser holler surfaces 70 or 74 on any one chaser holder 48, the two gibs used to clamp this holder may be adjusted toward the center of slideways 46 without changing the adjustment of these same gibs 78 in relation to the other two chaser holders 48 which they assist in clamping. Such an adjustment, furthermore, is equalized on the opposite sides of the neck portion 72 so that the fit between slot 50 and closing ring prong 42 is undisturbed.

In the case of wear on any of the chaser holder base surfaces 64, the appropriate gibs 78 are adjusted in the same manner and such wear is absorbed by the camming action of the inclined gib surfaces 82 against the chaser holder surfaces 74 to restore the original fit.

Therefore, the same adjustment is effective to remove the effects of wear between these parts whether the wear takes place in an axial direction, that is, between surfaces 64 and the face of gibs 78 and head body 20, or in a direction perpendicular thereto, that is, between the mating surfaces of chaser holder 48 and slideway 46.

We claim:

1. In a die head, a body member having slideways, chaser holders and chasers mounted therein, each of said chaser holders having a portion slideable in one of said slideways formed in said body member, said slideways being rectangular in cross section and consisting of a bottom planar surface and two rectangular side surfaces perpendicular to said bottom surface, and gibs retaining said chaser holder slide portions in said slideways, said chaser holder slide portions being in clearance relation to said bottom planar surfaces, said gib members being adjustable with respect to said slideways and having first bearing surfaces perpendicular to the axis of said head, said chaser holders having bearing surfaces which engage said first bearing surfaces on said gib members, second bearing surfaces on said gib members engaging said chaser holder slide portions on opposite sides, said second bearing surfaces being inclined with respect to both the bottom and side surfaces of said slideways in such a manner as to engage correspondingly inclined surfaces on said chaser holder to retain said chaser holder bearing surfaces in contact with said first bearing surfaces on said gibs.

2. In a die head, a body member having slideways, chaser holders and chasers mounted therein, each of said chaser holders having a first portion slideable in one of said slideways formed in said body member and a second narrowed neck portion integral with said first portion, said slideways being rectangular in cross section and consisting of a bottom planar surface and two rectangular side surfaces perpendicular to said bottom surface, and gibs retaining said chaser holder first slide portions in said slideways, said chaser holder first slide portions being in clearance relation to said bottom planar surfaces, and said second narrowed neck portions being in clearance relation to said gibs, said gib members being adjustable with respect to said slideways and having first bearing surfaces perpendicular to the axis of said head, said chaser holders having bearing surfaces which engage said first bearing surfaces on said gib members, second bearing surfaces on said gib members engaging said chaser holder slide portions on opposite sides, said second bearing surfaces being inclined with respect to both the bottom and side surfaces of said slideways in such a manner as to engage correspondingly inclined surfaces on said chaser holder to retain said chaser holder bearing surfaces in contact with said first bearing surfaces on said gibs.

3. In a die head, a body member having slideways, chaser holders and chasers mounted therein, each of said chaser holders having a first portion slideable in one of said slideways formed in said body member and a second narrowed neck portion integral with said first portion, said slideways being rectangular in cross section and consisting of a bottom planar surface and two rectangular side surfaces perpendicular to said bottom surface, and gibs retaining said chaser holder first slide portions in said slideways, said chaser holder first slide portions being in clearance relation to said bottom planar surfaces, and said second narrowed neck portions being in clearance relation to said gibs, said gib members being adjustable with respect to said slideways and having first bearing surfaces perpendicular to said side surfaces of said slideways, said chaser holders having bearing surfaces which engage said first bearing surfaces on said gib members, second bearing surfaces on said gib members engaging said chaser holder slide portions on opposite sides, said second bearing surfaces being inclined with respect to both the bottom and side surfaces of said slideways in such a manner as to engage correspondingly inclined surfaces on said chaser holder to retain said chaser holder bearing surfaces in contact with said first bearing surfaces on said gibs and to permit adjustment of said clearances in two directions simultaneously.

4. In a die head, a body member having slideways, chaser holders and chasers mounted therein, each of said chaser holders having a portion slideable in one of said slideways formed in said body member, said slideways being rectangular in cross section and consisting of a bottom planar surface and two rectangular side surfaces perpendicular to said bottom surface, and gibs retaining said chaser holder slide portions in said slideways, said chaser holder slide portions being in clearance relation to said bottom planar surfaces, said gib members being adjustable with respect to said slideways and having first bearing surfaces perpendicular to the axis of said head, said chaser holders having bearing surfaces which engage said first bearing surfaces on said gib members, second beveled bearing surfaces facing toward said slideways on said gib members engaging said chaser holder slide portions on opposite sides, said second bearing surfaces being inclined with respect to both the bottom and side surfaces of said slideways in such a manner as to engage correspondingly inclined surfaces on said chaser holder to retain said chaser holder bearing surfaces in contact with said first bearing surfaces on said gibs.

CHARLES A. REIMSCHISSEL.
HARRY E. DAVIES.

REFERENCES CITED

The following references are of record in the file of this patent:

UNITED STATES PATENTS

| Number | Name | Date |
|---|---|---|
| Re. 20,974 | Guirl | Jan. 10, 1939 |
| 187,248 | Bishop et al. | Feb. 13, 1877 |
| 368,462 | Emig | Aug. 16, 1887 |
| 649,548 | Reardon | May 15, 1900 |
| 837,515 | Stephens | Dec. 4, 1906 |
| 895,636 | Henn | Aug. 11, 1908 |
| 1,154,568 | Harrington | Sept. 21, 1915 |
| 1,299,828 | Fulton | Apr. 8, 1919 |
| 2,291,919 | Reimschissel | Aug. 4, 1942 |
| 2,291,920 | Reimschissel | Aug. 4, 1942 |

FOREIGN PATENTS

| Number | Country | Date |
|---|---|---|
| 23,781 | Great Britain | Oct. 21, 1913 |